United States Patent
Sy et al.

(10) Patent No.: US 11,808,063 B2
(45) Date of Patent: Nov. 7, 2023

(54) DOOR UNLOCK MECHANISM

(71) Applicants: STMicroelectronics S.r.l., Agrate (IT); STMicroelectronics, Inc., Coppell, TX (US)

(72) Inventors: Williamson Sy, Oak Park, MI (US); Emiliano Mario Piccinelli, Cavenago (IT); Keith Walters, Bloomington, MN (US)

(73) Assignees: STMicroelectronics S.r.l., Agrate Brianza (IT); STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 18/178,201

(22) Filed: Mar. 3, 2023

(65) Prior Publication Data
US 2023/0203854 A1    Jun. 29, 2023

Related U.S. Application Data

(62) Division of application No. 16/375,577, filed on Apr. 4, 2019, now Pat. No. 11,613,918.

(51) Int. Cl.
| | |
|---|---|
| *E05B 81/90* | (2014.01) |
| *E05B 77/54* | (2014.01) |
| *E05B 81/46* | (2014.01) |
| *E05B 81/56* | (2014.01) |
| *E05B 81/80* | (2014.01) |
| *B60R 25/24* | (2013.01) |
| *E05B 77/02* | (2014.01) |

(52) U.S. Cl.
CPC ............ *E05B 81/90* (2013.01); *E05B 77/54* (2013.01); *E05B 81/46* (2013.01); *E05B 81/56* (2013.01); *E05B 81/80* (2013.01); *B60R 25/24* (2013.01); *E05B 77/02* (2013.01); *E05Y 2900/531* (2013.01)

(58) Field of Classification Search
CPC .......... E05B 81/90; E05B 77/54; E05B 81/46; E05B 81/56; E05B 81/80; E05B 77/02; B60R 25/24; E05Y 2900/531
See application file for complete search history.

(56) References Cited

U.S. PATENT DOCUMENTS

| | | | |
|---|---|---|---|
| 6,062,613 A | 5/2000 | Jung et al. | |
| 7,287,785 B2 * | 10/2007 | Schupp | E05B 81/14 |
| | | | 292/201 |
| 8,979,160 B1 * | 3/2015 | Pericak | E05B 83/30 |
| | | | 224/544 |

(Continued)

FOREIGN PATENT DOCUMENTS

| | | |
|---|---|---|
| GB | 2528327 A | 1/2016 |
| JP | H0584760 U | 11/1993 |

*Primary Examiner* — Mark A Williams
(74) *Attorney, Agent, or Firm* — Slater Matsil, LLP

(57) ABSTRACT

A method and device for unlatching a door from a frame, using a keyless door latch system, is provided. In one embodiment, a secondary unlocking component receives a signal and derives power from the signal to provide a power source for the keyless door latch system. A microcontroller generates a control signal and an actuator, in response to receiving the control signal, actuates the secondary unlocking component, which allows an energy source, from an exterior of the door, to be transferred to the keyless door latch system for the unlatching of the door.

20 Claims, 10 Drawing Sheets

(56) References Cited

U.S. PATENT DOCUMENTS

| | | | |
|---|---|---|---|
| 2007/0029814 A1 | 2/2007 | Coleman et al. | |
| 2011/0252845 A1* | 10/2011 | Webb | E05D 11/00 290/1 R |
| 2012/0169453 A1* | 7/2012 | Bryla | E05C 1/08 340/3.1 |
| 2014/0000167 A1* | 1/2014 | Patel | E05B 81/34 49/32 |
| 2014/0230329 A1* | 8/2014 | Patel | E05B 17/10 70/91 |
| 2015/0102904 A1* | 4/2015 | Oh | E05B 47/0044 340/5.61 |
| 2015/0137531 A1* | 5/2015 | Papanikolaou | E05B 81/86 292/201 |
| 2016/0060909 A1* | 3/2016 | Krishnan | B60R 25/403 292/194 |
| 2017/0101076 A1 | 4/2017 | Krishnan | |
| 2018/0051493 A1 | 2/2018 | Krishnan et al. | |
| 2019/0145146 A1* | 5/2019 | Linden | E05F 15/40 49/28 |
| 2019/0292818 A1* | 9/2019 | Cumbo | E05C 17/003 |
| 2021/0301561 A1* | 9/2021 | Cumbo | E05B 83/36 |

* cited by examiner

DOOR UNLOCK MECHANISM

PRIORITY CLAIM AND CROSS-REFERENCE

This application is a divisional of U.S. patent application Ser. No. 16/375,577, entitled "Door Unlock Mechanism" and filed on Apr. 4, 2019, which application is incorporated herein by reference.

TECHNICAL FIELD

The present disclosure relates generally to locks and latches, and, in particular embodiments, to a keyless entry system having a backup unlatching component powered by an external power source.

BACKGROUND

Automobile manufacturers include keyless entry systems to provide controlled remote access to the interior of a vehicle. A keyless entry system performs the functions of a traditional mechanical lock without the mechanical lock (i.e., key lock) hardware. The keyless entry system typically includes a keyless remote that operates in tandem with a keyless door latch system fitted in, for example, a vehicle door. The keyless remote communicates with the keyless door latch system for access control. An electrical power source of the vehicle (e.g., vehicle battery) provides the energy to operate the keyless door latch system.

SUMMARY

Technical advantages are generally achieved by embodiments of this disclosure, which describe a keyless entry system having a backup unlatching component powered by an external power source.

A first aspect relates to a keyless door latch system for a door, the keyless door latch system includes a receiver configured to receive a signal, a power controller configured to derive power from the signal and to provide a power source for the keyless door latch system, a microcontroller configured to generate a control signal, and an actuator configured to receive the control signal, and based thereon, actuate a secondary unlocking component of the door, the actuating of the secondary unlocking component permitting an energy source, from an exterior of the door, to be transferred to the keyless door latch system to unlatch the door.

In a first implementation form of the keyless door latch system according to the first aspect, the receiver is a near-field communication (NFC) antenna capable of operating within NFC communication protocols In a second implementation form of the keyless door latch system according to the first aspect as such or any preceding implementation form of the first aspect, the signal is received from a keyless remote in a vicinity of the keyless door latch system.

In a third implementation form of the keyless door latch system according to the first aspect as such or any preceding implementation form of the first aspect, the keyless door latch system further includes a non-transitory memory storage configured to store an authorization verification key. The received signal further includes an authorization signal. The microcontroller is further configured to verify an authenticity of the authorization signal in accordance with the authorization verification key, and based thereon, generate the control signal.

In a fourth implementation form of the keyless door latch system according to the first aspect as such or any preceding implementation form of the first aspect, the secondary unlocking component includes a clutch component configured to receive the energy source, from the exterior of the door, to unlatch the door.

In a fifth implementation form of the keyless door latch system according to the first aspect as such or any preceding implementation form of the first aspect, the clutch component includes an inner cone connected to a shaft connected to an interior door handle, the inner cone having a first guidance slot, an outer cone connected to a shaft connected to an exterior door handle, the outer cone having a second guidance slot, the first and second guidance slot aligned with each other, and a spike located within the first and second guidance slot, the spike configured to move the inner cone towards the outer cone based on an actuation of a pin in the secondary unlocking component and to mechanically connect the inner cone and the outer cone.

In a sixth implementation form of the keyless door latch system according to the first aspect as such or any preceding implementation form of the first aspect, the actuator is a solenoid, a micro-solenoid, an electrical motor, or a stepper motor.

In a seventh implementation form of the keyless door latch system according to the first aspect as such or any preceding implementation form of the first aspect, the microcontroller is configured to generate the control signal in response to determining a failure in a primary unlocking component of the door or in response to determining an occurrence of an event.

A second aspect relates to a keyless door latch system for a door, the keyless door latch system including an antenna configured to receive a signal, a power controller configured to derive power from the signal and to provide a power source for the keyless door latch system, a microcontroller configured to generate a control signal, and an actuator configured to receive the control signal, and based thereon, actuate a secondary unlocking component of the door, the actuating of the secondary unlocking component causing a stored energy in the keyless door latch system to unlatch the door.

In a first implementation form of the keyless door latch system according to the second aspect, the antenna is a near-field communication (NFC) antenna capable of operating within NFC communication protocols.

In a second implementation form of the keyless door latch system according to the second aspect as such or any preceding implementation form of the second aspect, the signal is received from a keyless remote in a vicinity of the keyless door latch system.

In a third implementation form of the keyless door latch system according to the second aspect as such or any preceding implementation form of the second aspect, the secondary unlocking component includes a clutch component configured to receive the stored energy to unlatch the door.

In a fourth implementation form of the keyless door latch system according to the second aspect as such or any preceding implementation form of the second aspect, the clutch component includes an inner cone connected to a shaft connected to an interior door handle, a clutch actuator connected to the inner cone, an outer cone connected to a shaft connected to an exterior door handle, and an actuation shaft configured to engage the clutch actuator causing the inner cone to move towards the outer cone and mechanically connect the inner cone to the outer cone.

In a fifth implementation form of the keyless door latch system according to the second aspect as such or any preceding implementation form of the second aspect, the microcontroller is configured to generate the control signal in response to determining a failure in a primary unlocking component of the door or in response to determining an occurrence of an event.

A third aspect relates to a method for unlocking a keyless door latch, the method includes receiving a signal, providing an external power source for the keyless door latch, the external power source derived from the signal, generating a control signal using the external power source, and actuating a secondary unlocking component in response to the control signal, the actuating permitting an energy source, from an exterior of a door, to be transferred to the keyless door latch to unlatch the door.

In a first implementation form of the method according to the third aspect, the method further includes determining a failure in a primary unlocking component of the door, and based thereon, generating the control signal.

In a second implementation form of the method according to the third aspect as such or any preceding implementation form of the third aspect, the signal is based on near-field communication (NFC) protocols.

A fourth aspect relates to a method for unlocking a keyless door latch, the method includes receiving a signal, providing an external power source for the keyless door latch, the external power source derived from the signal, generating a control signal using the external power source, and actuating a secondary unlocking component in response to the control signal, the actuating causing a stored energy to unlatch a door.

In a first implementation form of the method according to the fourth aspect, the method further includes determining a failure in a primary unlocking component of the door, and based thereon, generating the control signal.

In a second implementation form of the method according to the fourth aspect as such or any preceding implementation form of the third aspect, the signal is based on near-field communication (NFC) protocols.

Embodiments can be implemented in hardware, software, or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
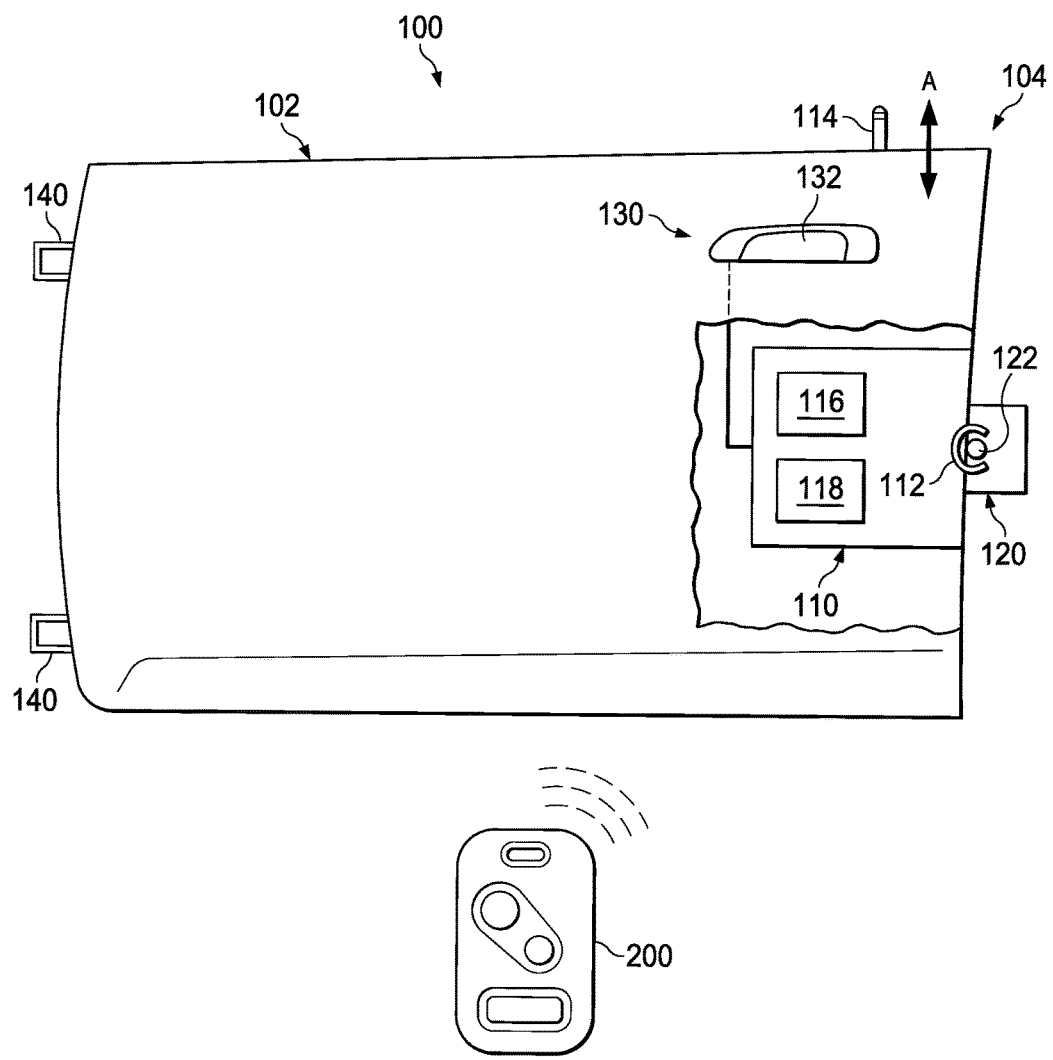
FIG. 1 illustrates an embodiment vehicle door assembly with an electronic keyless door latch system.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims.

While the inventive aspects are described primarily in the context of an unlocking mechanism used in a door of an automobile and using near-field communication (NFC) protocol/standards, it should also be appreciated that these inventive aspects may also be applicable to any general unlocking mechanism using other standard or proprietary methods of communication and power transference. For example, the embodiment methods and systems described in this disclosure can be similarly applied to a keyless entry system in an entry gate, entry door, shared storage area, storage locker, delivery box, desk drawer, hotel room entry points, rental unit entry points, windows, and similarly controlled units and areas.

Furthermore, although embodiments of this disclosure are described using a clutch mechanism, and particularly a cone clutch structure mechanically moving an inner cone relative to an outer cone, it should be appreciated that these inventive aspects are also applicable to any general clutch system/mechanism and more generally to any system/mechanism that when actuated, permits an energy source, from an exterior of the door, to be transferred to a keyless latch system to unlatch the door or to cause a stored energy in the keyless door latch system to unlatch the door.

As described above, a keyless door latch system requires an electrical power source for operation. Car manufacturers may include a mechanical lock as a backup solution to add additional means of access to the vehicle. Another backup solution is the addition of an auxiliary power source in the vehicle to be used as a backup to the primary power source.

In reality, situations may arise when these backup solutions become deficient. As a way of example, in a ride-sharing use case, the mechanical key may be easily copied by a customer, which presents a risk of theft or unauthorized use. Additionally, the mechanical key is required to be physically transferred from one authorized user to another, which can present additional complications. As another example, the auxiliary power source, similar to the primary power source, can easily discharge of energy if remained idle for a period of time. Accordingly, systems and techniques to unlock a keyless entry system when the primary unlocking mechanism becomes unavailable are desired.

Embodiments of this disclosure provide systems and techniques to unlock a keyless entry system using a secondary unlocking component. In particular, in an embodiment, a keyless door latch system in the keyless entry system is capable of operating in two modes of operation. In a primary operational mode (i.e., default mode of operation), a primary source of power provides energy to a primary unlocking component used to unlock a locking mechanism. In a secondary operational mode (i.e., when the primary operational mode becomes unavailable), an external power source (i.e., keyless remote) provides energy to a secondary unlocking component to unlock the locking mechanism.

In an embodiment, the secondary operational mode is activated after determining that the primary unlocking component is unavailable. For example, when the power supply is unavailable to the primary unlocking component, when the primary power source is unable to provide a minimum amount of power to the primary unlocking component (i.e., less than a minimum power threshold), or a as a result of a failure to one of the primary power supply, the primary unlocking component, a communication link between the two components, a mechanical link between the components, or the like.

In another embodiment, the secondary operational mode is activated as a feature in the keyless entry system in response to an occurrence of an event or a combination of events. For instance, the keyless entry system, or a computer in the vehicle, may detect that the vehicle is locked, that the keyless remote is inside the vehicle, and that someone is located in the backseat of the vehicle. As a safety feature, a user can enable a feature that upon detecting a combination of these items, to enable the secondary operational mode.

As another example, the secondary unlocking component may be activated as a result of an accident involving the vehicle, a failure of the vehicle engine, a fire near or within the vehicle, disablement of the driver or passenger, or the like. A user can enable events or combination of events, that when detected, enables the secondary operational mode. This can advantageously give emergency personal quick access the interior vehicle.

In another example, a beacon inside the vehicle may detect a physical location of the keyless remote inside the vehicle. For instance, the keyless entry system may detect that the vehicle has been locked and that the keyless remote is located in the trunk of the vehicle. In response, the secondary operational mode may be enabled.

The feature may be pre-programmed in the vehicle, programmed during a service visit, through an over-the-air (OTA) update, through an interface with a smartphone application, or the like. The feature may be user selectable via an application interface using, for example, an interface on the vehicle, smartphone application, or the like.

In any of these embodiments, the keyless door latch system includes a low energy backup mechanical device that is operational without the need for any onboard power source available on the vehicle. The secondary unlocking component provides a low energy backup solution to unlock the vehicle door. In some embodiments, the secondary unlocking component may actuate a mechanism typically used to unlock the vehicle door from the interior of the vehicle. In other embodiments, the secondary unlocking component provides a means to unlock or unlatch the door using an external force from the outside of the vehicle. The secondary unlocking component does not prevent the unlocking of the door in the primary operational mode, however, it is prevented from unlocking the door in the primary operational mode. The secondary unlocking component provides an auxiliary method of unlocking the vehicle door using minimal power in the event of, for example, a failure to the primary operational mode or as a selected feature.

Aspects of this disclosure provide embodiment methods and solutions that advantageously use the mechanical power of the hand to unlock the vehicle door from the exterior of the vehicle. Thus providing a low power solution to unlock the vehicle door in the event of a fault at the primary unlocking component. The fault at the primary unlocking component may be a result of a bad or dying car battery, a mechanical failure in the primary unlocking mechanism (e.g., fried primary solenoid), power line fault from the car battery to the primary unlocking component, signal fault at the vehicle computer or primary unlocking component, failure to receive a confirmation signal regarding proper functioning of the vehicle computer or primary unlocking component, and other reasons. In other embodiments, the low power solution may be advantageous as a selectable feature that is enabled in response to an occurrence of an event or a combination of events.

In most vehicles, the pulling on an interior door handle unlocks the vehicle without the need to first unlock a locking component. In some vehicles, a first pull on the interior door handle unlocks the locking component of the door and a second pull on the interior door handle results in the unlatching of the door from the frame of the vehicle. In either case, the motion on the interior door handle results in the unlocking and/or unlatching of the vehicle door from the door frame. Embodiments of this disclosure use the power from the keyless remote to actuate, for example, a pin or lever (i.e., using an actuator in the secondary unlocking component) to engage a shaft, connected to the interior door handle, to a shaft, connected to the exterior door handle. As a result, when the two shafts are engaged, the motion on the exterior door handle results in the same effect as if the motion was attempted from the interior of the vehicle.

In one embodiment, the shaft, connected to the interior door handle, engages the shaft, connected to the exterior door handle, using a pin and guidance slot in a cone clutch mechanism. The two shafts, when moved towards each other, use frictional contact between an inner cone and outer cone connected to each shaft to mechanically connect to each other. In this embodiment, the pin is driven into the guidance slot using an actuator in the secondary unlocking component.

In another embodiment, the shaft, connected to the interior door handle, engages the shaft, connected to the exterior door handle, using a spring-loaded actuation shaft. The movement of a pin or lever, using an actuator in the secondary unlocking component, drives a clutch actuator in the cone clutch mechanism to move the inner and outer cone towards each other, which results in the mechanical connection between two shafts.

In yet another embodiment, the shaft, connected to the interior door handle, engages the shaft, connected to the exterior door handle, using an actuation shaft using a force from the exterior of the vehicle. The movement of a pin or lever, using an actuator in the secondary unlocking component, allows the force to move the actuation shaft and drive a clutch actuator in the cone clutch mechanism to move the inner and outer cone towards each other, which results in the mechanical connection between two shafts.

In any of these cases, the inner cone and outer cone when engaged, mechanically connects the shaft, connected to the interior door handle, to the shaft, connected to the exterior door handle. These solutions make a mechanical lock redundant and unnecessary, which results in a reduction in the complexity of the unlocking mechanism in a door assembly.

In some embodiments, the operational switch between the primary operational mode and the secondary operational mode may be seamless to the user. As an example, a user wanting entry to the vehicle may bring a keyless remote near the keyless door latch system. The keyless remote provides the external power source for the operation of a controller in the keyless door latch system through, for example, an inductive transference of power. The controller, using the power derived from the keyless remote, determines that the primary power supply is inaccessible at the primary unlocking component, which results in the secondary operational mode to become the active mode of operation. This may be advantageous when the primary power supply is functioning but inaccessible at the primary unlocking component as a result of, for example, a fault in the power line from the primary power supply. The controller may directly or indirectly, for example through the keyless remote, communicate the fault in the power line to the vehicle computer/user and notify the user of the fault and a need for repair.

In other embodiments, the keyless remote may have a primary input that is used to unlock the keyless door latch system in the primary operational mode and a secondary input that is used to unlock the keyless door latch system in the secondary operational mode. In this embodiment, the user of the keyless remote may opt to use the secondary input after determining that the primary input is unable to unlock the vehicle. This may be advantageous in reducing power usage by the keyless remote and to improve system efficiency.

In some embodiments, the keyless remote may be a key-fob, a cellular phone, a smart card, or any other device capable of providing an external power source and optionally communicating authorization and/or authentication signals with the keyless door latch system. In other embodiments, the keyless remote may be a combination of these devices.

In some embodiments, a pair of a near-field communication (NFC) antennas, using NFC protocols, may be used to transfer power from the keyless remote to the keyless door latch system in the secondary operational mode. NFC provides a widely available and efficient method to provide a power source for the secondary unlocking component. These and other aspects are discussed in greater detail below.

FIG. 1 illustrates an embodiment door assembly 100 with an electronic keyless door latch system no. The door assembly 100 also includes a locking component 114, a door striker assembly 120, a door handle assembly 130, and hinges 14o. In addition, the door assembly includes an interior door handle assembly (not shown) accessible to the interior of the vehicle.

The locking component 114 can be configured to be in a locked position or in an unlocked position (as indicated using the A arrow) to control access to the interior of the vehicle. In some embodiments, the locking component 114 is a lock button.

The electronic keyless door latch system no includes a door striker 112, a primary unlocking component 116, and a secondary unlocking component 118. The locking component 114 is connected to the electronic keyless door latch system no. The primary unlocking component 116 is the default component used to lock or unlock the locking component 114 from the outside of the vehicle. The secondary unlocking component 118 is a backup to the primary unlocking component 116. The secondary unlocking component 118 is enabled when the primary unlocking component 116 is unable to unlock the locking component 114. Exterior to the car, the primary unlocking component 116 and the secondary unlocking component 118 are controlled using a keyless remote 200.

In one embodiment, the primary unlocking component 116 and the secondary unlocking component 118 are the only unlocking mechanisms in the door assembly 100. In such an embodiment, the door assembly 100 may not include a mechanical lock capable of locking or unlocking the door 102 using a mechanical key. In other embodiments, the door assembly 100 may have the necessary components (e.g., lock cylinder) to allow a mechanical key to unlock the vehicle—this is not shown in FIG. 1.

The door striker assembly 120 includes a door striker plate 122 mounted on the surface of the doorframe 104. The door strike plate 122 guides and catches on the door striker 112 to create a tight fit when the door 102 is in the closed position. The hinges 140 allow the door 102 to swing outward from the body of the vehicle.

In some embodiments, unlatching the door 102 from the doorframe 104 refers to the unlocking of the locking component 114. In other embodiments, unlatching the door 102 from the door frame 104 refers to the unlatching of the door strike plate 122 from the door striker 112. In other embodiments, unlatching the door 102 from the doorframe 104 refers to the unlocking of the unlocking component 114 and the unlatching of the door strike plate 122 from the door striker 112. The electronic keyless door latch system no may include, alternatively or in addition to the locking component 114, a direct locking component tied to the latching mechanism of the door strike plate 122 and the door striker 112. In such an embodiment, the latch and lock mechanism may be combined into one structure and/or mechanism. In other embodiments, the latch and lock mechanism and/or structure may be two separate mechanisms and/or structures. As an example, a door may be in a latched position and have a separate lock bolt (e.g., dead bolt lock).

The door handle assembly 130 includes a lever 132 that is contact with the electronic keyless door latch system no when the locking component 114 is in the unlocked position. The door handle assembly 130 is in contact with the electronic keyless door latch system no through a mechanical connection (e.g., cable) that is disconnected when the locking component 114 is in the locked position.

In some embodiments, the door handle assembly 130 may include a knob (not shown). In other embodiments, the door handle assembly 130 may be devoid of any particular externally accessible mechanism such as the lever 132. In such embodiments, the door handle assembly 130 may release the latching mechanism in the door assembly 100 using, for example, an electronic signal, a push mechanism on a surface at a sufficient distance from the hinges 14o, or other similar mechanisms. In some embodiments, the door assembly 100 may include an electrically or mechanically automated opening mechanism that swings the door 102 outward from the body of the vehicle in response to the releasing of the latching mechanism on the door assembly 100.

If the locking component 114 is in the unlocked position, the lever 132 can unlatch the door striker 112 from the door striker plate 122. When the door striker 112 is unlatched from the door striker plate 122, the door can be opened. Alternatively, if the locking component 114 is in the locked position, the lever 132 does not unlatch the door striker 112 from the door striker plate 122. As the door striker 112 remains latched to the door striker plate 122, the door remains closed and locked. Further details are provided using FIGS. 4A-B.

In a primary operational mode, the vehicle's primary power supply (e.g., vehicle battery) provides the necessary power to unlock the locking component 114 using the primary unlocking component 116.

In a secondary operational mode, the keyless remote 200 provides the requisite power for the secondary unlocking component 118 to actuate a pin or lever to engage a shaft, connected to the interior door handle, to a shaft connected to the exterior door handle. The mechanical connection between the two shafts allows a user to motion the exterior door handle and to unlatch the door striker 112 from the door striker assembly in a similar principle of operation to the unlocking mechanism used to unlock a door using the interior door handle. Additional details are provided in FIGS. 6A-B.

The secondary operational mode is activated after determining that the primary unlocking component 116 is incapable of unlocking the vehicle door and/or an authorized wireless signal is received from the keyless remote 200.

Figure 2:
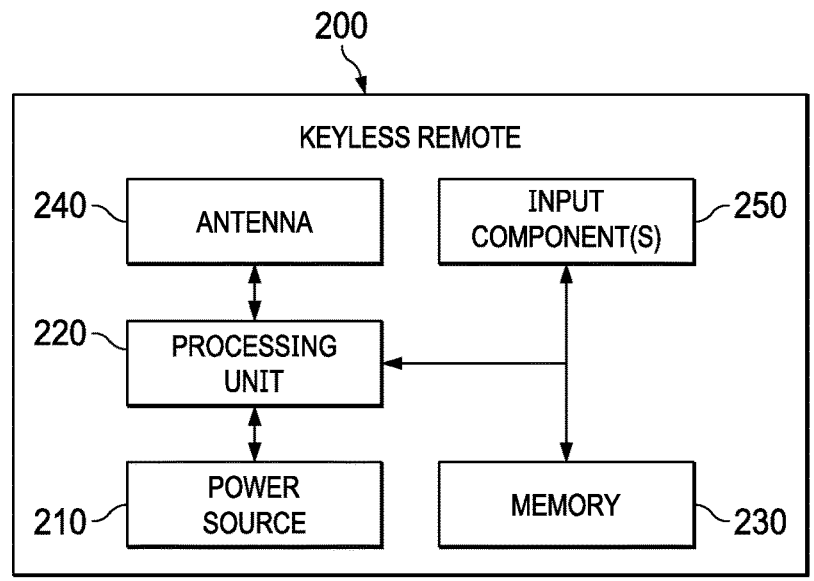
FIG. 2 illustrates a block diagram of an embodiment keyless remote.

FIG. 2 illustrates an embodiment keyless remote 200. As shown, the keyless remote includes a power source 210, a processing unit 220, a memory 230, an antenna 240, and optionally one or more input components 250, which may (or may not) be arranged as shown. In some embodiments, the keyless remote 200 may also include additional components that are not shown.

In some embodiments, the keyless remote 200 may be a key-fob, a cellular phone (e.g., smartphone), a smart card, or any other device capable of providing an external power source and optionally communicating authorization signals with the electronic keyless door latch system no. In some embodiments, a combination of these devices may be used as the keyless remote 200. A typical smartphone contains about 300 joules (J) of energy at full charge, which can provide enough energy to actuate the primary unlocking component. The smartphone, however, may be limited in the amount of power it can transfer. As an example, using NFC technology at about 10 mW, nearly 17 minutes is required to provide 10 J to the electronic keyless door latch system, which is impractical. Embodiments of this disclosure utilize a secondary unlocking component capable of operating using significantly less energy, which provides a backup unlocking mechanism that significantly minimizes transfer time and provides for a practical means to unlatch and/or unlock the door.

In one embodiment, a smartphone may be used as a virtual digital key to unlock the vehicle using a common industry standard communication protocol (e.g., digital key standard from the car connectivity consortium) or a propriety communication format (e.g., Tesla or Ford using phone as a key (PAAK) feature). In these embodiments, close-range near field communication (NFC) can be used to communicate and transfer power between the keyless remote 200 and the primary unlocking component 116 and/or the secondary unlocking component 118. As an example, a software application on the smartphone may provide temporary access to the vehicle by an authorized user. This may be advantageous, for example, in car sharing or rental car use cases.

The power source 210 may be any component that provides an electrical power source to the keyless remote 200. Examples of the power source 210 include nickel metal hydride (NiMH), nickel-cadmium (NiCd), nickel-zinc (NiZn), and lithium-ion (Li-ion) cells.

The processing unit 220 implements various processing operations for the keyless remote 200. As an example, the processing unit 220 can perform signal coding, data processing, power control, input/output processing, or any other functionality enabling the operation of the keyless remote 200. The processing unit 220 includes any suitable processing or computing device configured to perform programming operations. The processing unit 220 could, for example, include a microprocessor, a microcontroller, a digital signal processor, a field programmable gate array (FPGA), or an application specific integrated circuit (ASIC). The keyless remote 200 is shown to have a single processing unit, however, in some embodiments multiple processing units may be included.

In some embodiments, the processing unit 220 may generate encoded or non-encoded wireless signals in a standard or a proprietary format to be transmitted to the electronic keyless door latch system no. In some embodiments, the wireless signal may be an infrared (IR) signal or an ultrasonic signal. The wireless signals may be used to communicate an authorization signal to satisfy a condition to operate the electronic keyless door latch system no in the secondary operational mode. The processing unit 220 may use data stored in the memory 230 to generate and/or encode the wireless signal. The processing unit 220 may receive encoded or non-encoded wireless signals in a standard or proprietary format using the antenna 240 from the electronic keyless door latch system no as feedback. The wireless signals may be encoded or decoded and may be communicated using a standard or a proprietary format.

The memory 230 may be configured to store data, programs, and other information and to make the data, programs, and other information accessible to the processing unit 220. The memory 230 may include any type of non-transitory system memory such as static random access memory (SRAM), dynamic random access memory (DRAM), synchronous DRAM (SDRAM), read-only memory (ROM), or a combination thereof. In an embodiment, the memory 230 may include ROM for use at boot-up, and DRAM for program and data storage for use while executing programs. The memory 230 may include, for example, one or more of a solid-state drive, hard disk drive, a magnetic disk drive, removable memory drive, or an optical disk drive.

The antenna 240 may be used to transmit power from the keyless remote 200 through contactless transfer of energy. The antenna 240 may include one or more inductors (e.g., wrapped coil of wire or looped coil) that utilizes mutual coupling to enable the contactless transfer of energy from the keyless remote 200 to the electronic keyless door latch system 110. In one embodiment, the antenna 240 may be an NFC antenna and capable of operating under NFC protocols/standards at a frequency of around 13.56 Megahertz (MHz).

The input component can include one or more input triggers, such as an electronic or mechanical button. A user of the keyless remote 200 upon pressing or activating a button on the keyless remote can generate a signal to the processing unit 220, which can excite an alternating current at the antenna 240 using the power source 210. In addition, the triggering of the button can generate the wireless signal that can be received and/or decoded by the electronic keyless door latch system no to verify that an authorized user is triggering the unlocking of the door 102 in the secondary operational mode.

In some embodiments the operational switch between the primary operation mode and the secondary operational mode at the electronic keyless door latch system no may be seamless to the user.

As an example, a user wanting entry to the vehicle may bring the keyless remote 200 near the electronic keyless door latch system no to unlock the vehicle. As a result, the keyless remote 200 provides an external power source for the electronic keyless door latch system no. The electronic keyless door latch system no, using the power derived from the keyless remote 200, determines that the vehicle's primary power supply is inaccessible to the keyless door latch system, causing the secondary operational mode to become active. This may be advantageous when the vehicle's primary power supply is functioning but inaccessible to the door 102 as a result of, for example, a fault in the power line from the vehicle's primary power supply to the electronic keyless door latch system no.

In some embodiments, the keyless remote 200 may receive a feedback signal from the electronic keyless door latch system no indicating a fault in the primary unlocking component 116 and the need for repair.

Figure 3:
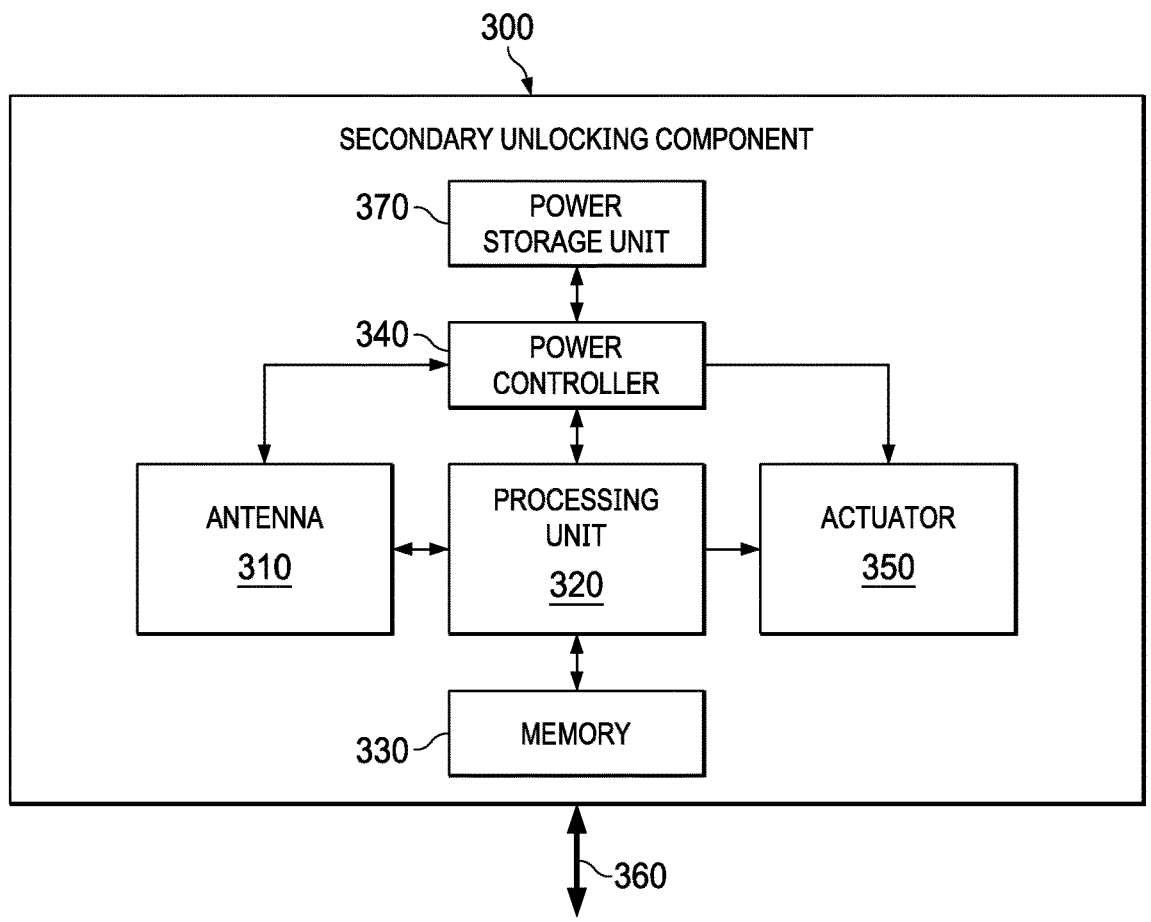
FIG. 3 illustrates a block diagram of an embodiment secondary unlocking component in the electronic keyless door latch system.

FIG. 3 illustrates a schematic of an embodiment secondary unlocking component 118 used to unblock a backup locking mechanism in the electronic keyless door latch system no. The secondary unlocking component 118 includes an antenna 310, a processing unit 320, a memory unit 330, a power controller 340, and an actuator 350, which may (or may not) be arranged as shown. Optionally, the secondary unlocking component 118 may include a power storage unit 370 for temporary power storage. In some embodiments, the secondary unlocking component 118 may include other components that are not shown.

The antenna 310 may be any type of receiving device used to receive power from the keyless remote 200, for example to operate in the secondary operational mode, through contactless transfer of energy. The antenna 310 may include one or more inductors (e.g., wrapped coil of wire or looped coil) that utilizes mutual coupling to enable the contactless transfer of energy from the keyless remote 200 to the secondary unlocking component 118. In one embodiment, the antenna 310 may be an NFC antenna and capable of operating under NFC protocols/standards at a frequency of around 13.56 Megahertz (MHz).

In some embodiments, the antenna 310 may be used to receive and/or transmit wireless signals (i.e., data) between the secondary unlocking component 118 and the keyless remote 200. The wireless signals may be encoded or decoded and may be communicated using a standard or a proprietary format. In some embodiments, the antenna 310 may be any device capable of receiving a power signal and/or authentication signal from the keyless remote. In some embodiments, the signal may be an infrared (IR) signal or an ultrasonic signal.

In some embodiments, the wireless signal is able to provide a power source to the electronic keyless door latch system 110 that is less than 10 milliwatt (mW).

The processing unit 320 implements various processing operations for the secondary unlocking component 118. For example, the processing unit 320 can perform signal coding, data processing, power control, input/output processing, or any other functionality enabling the secondary unlocking component 118 to operate in the electronic keyless door latch system no. The processing unit 320 includes any suitable processing or computing device configured to perform programming operations. Each processing unit 320 could, for example, include a microprocessor, a microcontroller, a digital signal processor, a field programmable gate array (FPGA), or an application specific integrated circuit (ASIC). The secondary unlocking component 118 is shown to have a single processing unit, however, in some embodiments multiple processing units may be included.

The processing unit 320 may receive encoded or non-encoded wireless signals from the processing unit 220 of the keyless remote 200 through the antenna 310. The wireless signals may be used to communicate an authorization signal to satisfy a condition to operate the electronic keyless door latch system no in the secondary operational mode. The processing unit 320 may use data stored in the memory 330 to decode the wireless signal and/or to verify the authenticity of the wireless signal. The processing unit 320 may transmit encoded or non-encoded wireless signals through the antenna 310 to the keyless remote 200 as a feedback signal.

In one embodiment, the processing unit 320 can communicate with the vehicle's main computer or with other components in the vehicle, such as the primary unlocking component 116 using the communication bus 360. In some embodiments, the processing unit 320 can use the communication bus 360 to determine whether the primary unlocking component 116 is inaccessible or whether the primary unlocking component 116 is not receiving power from the vehicle's power supply. In another embodiment, the processing unit 320 can use the communication bus 360 to communicate a feedback with the vehicle's main computer and indicating a fault with the primary unlocking component 116.

The memory 330 may be configured to store data, programs, and other information and to make the data, programs, and other information accessible to the processing unit 320. The memory 330 may include any type of non-transitory system memory such as static random access memory (SRAM), dynamic random access memory (DRAM), synchronous DRAM (SDRAM), read-only memory (ROM), or a combination thereof. In an embodiment, the memory 330 may include ROM for use at boot-up, and DRAM for program and data storage for use while executing programs. The memory 330 may include, for example, one or more of a solid-state drive, hard disk drive, a magnetic disk drive, removable memory drive, or an optical disk drive.

The power controller 340 may be used to condition the received power at the antenna 310 to provide a conditioned power source to the various components of the secondary unlocking component 118. In some embodiments, the power controller 340 and the processing unit 320 may be the same component or manufactured on a same controller chip to allow for a more elegant, efficient, and smaller form factor design of the secondary unlocking component 118.

Optionally, the secondary unlocking component 118 may also include a power storage unit 370 that can be used by the power controller 340 for temporary power storage. In some embodiments, the power storage unit 370 may be a battery or a capacitor. In some embodiments, the power controller 340 may itself include a capacitor for temporary power storage.

The actuator 350 may be any component that receives a control signal from the processing unit 320 and a power source from the power controller 340 and, in response to receiving the control signal, converts the energy from the power source to activate a pin, switch, valve, or to cause a linear or circulator motion to move or displace a mechanical component coupled to the actuator 350. As an example, the actuator 350 can be a solenoid, a micro-solenoid, an electrical motor, a stepper motor, or similar components operational using low amounts of energy (e.g., less than 10 W).

In the secondary operational mode, the keyless remote 200 excites an alternating current through the antenna 240, for example, in response to a user selecting a key or button on the keyless remote 200. The current at the antenna 240, while the keyless remote 200 is near the secondary unlocking component 118, induces a magnetic field, which further (through mutual coupling) induces an electrical current at the antenna 310. The induced electrical current is then conditioned using the power controller 340. The processing unit 320, uses the energy received from the power controller 340 to power up and to determine whether or not the necessary conditions to operate the electronic keyless door latch system in the secondary operational mode have been met. If the processing unit 320 determines that the necessary conditions have been met, the processing unit 320 transmits a control signal to the actuator 350. The Actuator 350 upon receiving the control signal, converts the energy from the power controller 340 to a mechanical movement in the secondary operational mode as discussed.

In some embodiments, the processing unit 320 may generate a feedback signal that is communicated to the vehicle, directly or indirectly through the keyless remote 200. The feedback signal can be used to indicate a failure of the vehicle's primary power source in providing a power source to the primary unlocking component 116 and the need for repair.

Figure 4A:
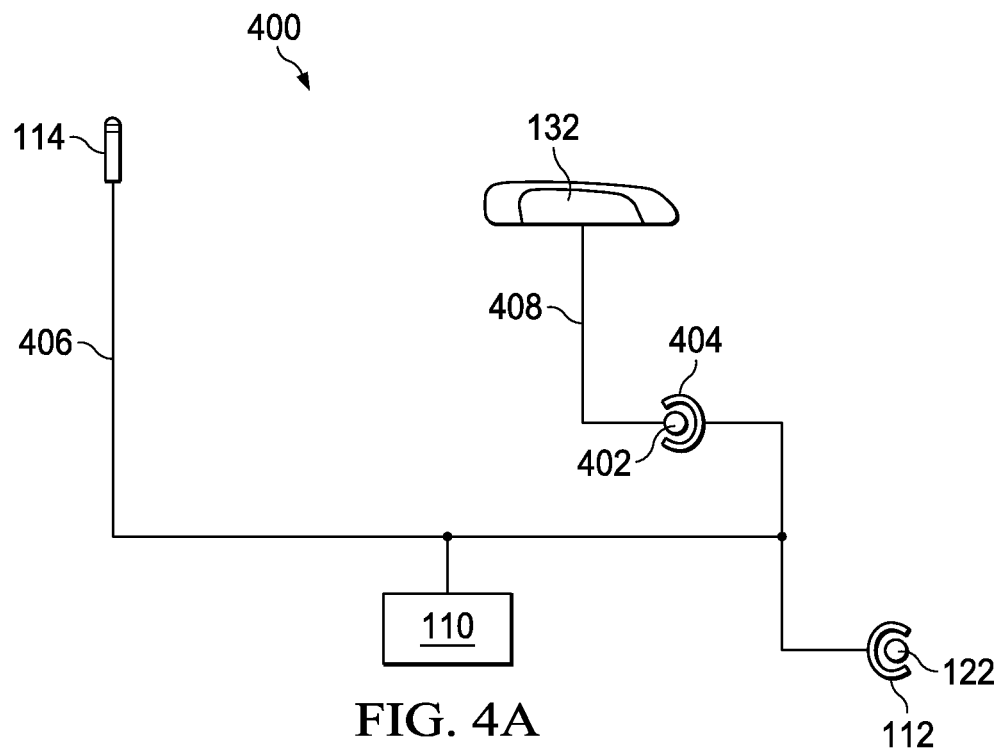
FIGS. 4A-B illustrate a simplified locking mechanism in a vehicle door.
Figure 4B:
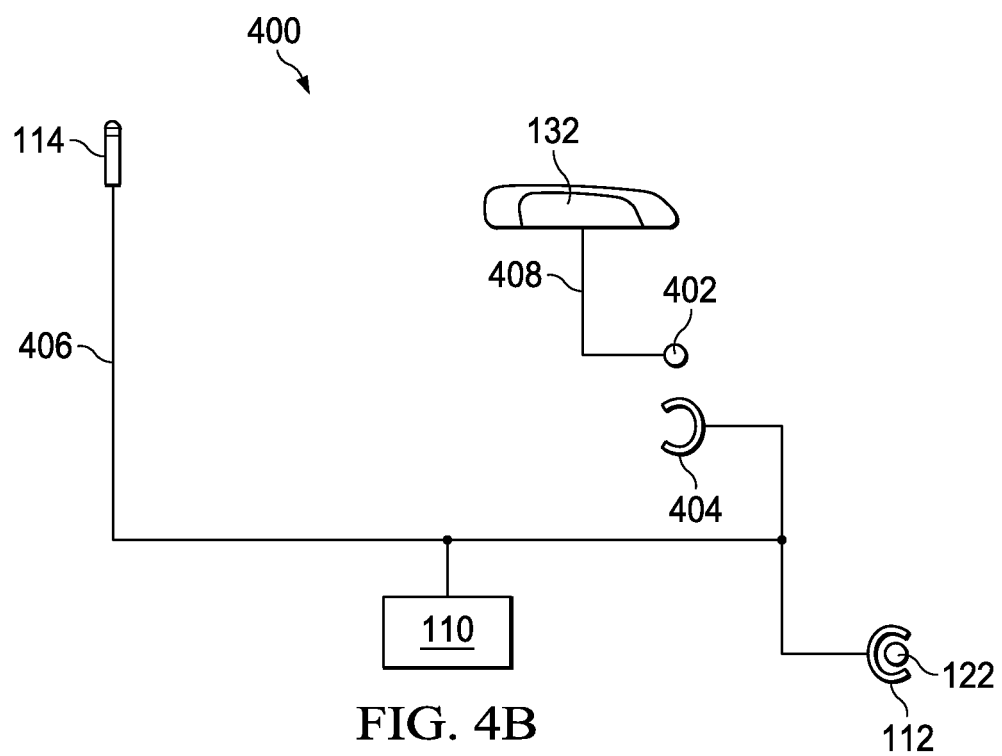

FIGS. 4A-B illustrate a simplified locking mechanism of a vehicle door 102. FIG. 4A illustrates the locking mechanism 400 when the locking component 114 is in the unlocked position. FIG. 4B illustrates the locking mechanism 400 when the locking component 114 is in the locked position. The locking component 114 is connected to the door striker 112 and to the lever striker 404 through a mechanical rod 406. The lever 132 is connected to the lever striker plate 402 through a second mechanical rod 408.

In FIG. 4A, the locking component 114 is in the unlocked position. As shown, the lever striker 404 is latched and in contact with the lever striker plate 402. The movement of the second mechanical rod 408, through the positioning of the lever 132, unlatches the door striker 112 from the door striker plate 122 through the mechanical rod 406 and allows the opening of the vehicle door.

In FIG. 4B, the locking component 114 is in the locked position. The positional change of the locking component 114 from the unlocked position to the locked position results in a disconnect between the lever striker 404 and the lever striker plate 402. This results in disconnect between the second mechanical rod 408 and the mechanical rod 406. As the mechanical rods are disconnected, the positioning of the lever 132 does not unlatch the door striker 112 from the door striker plate 122 and the door remains closed and locked.

As shown is FIGS. 4A-B, the locking component 114 can be moved from the unlocked position (i.e., FIG. 4A) to the locked position (i.e., FIG. 4B) by the electronic keyless door latch system no. Specifically, the vehicle's power supply provides the electrical energy to mechanically move the locking component 114 from the unlocked position to the locked position, and vice versa.

It should be noted that the locking mechanism shown in FIGS. 4A-B is simplified version of a commercial locking mechanism and is illustrated as such for purposes of the discussion. A commercial locking mechanism may have additional components and complexities to, for example, address safety issues and to provide a smoother operation. However, embodiments of this disclosure can be readily adapted to these commercial locking mechanisms.

Figure 5:
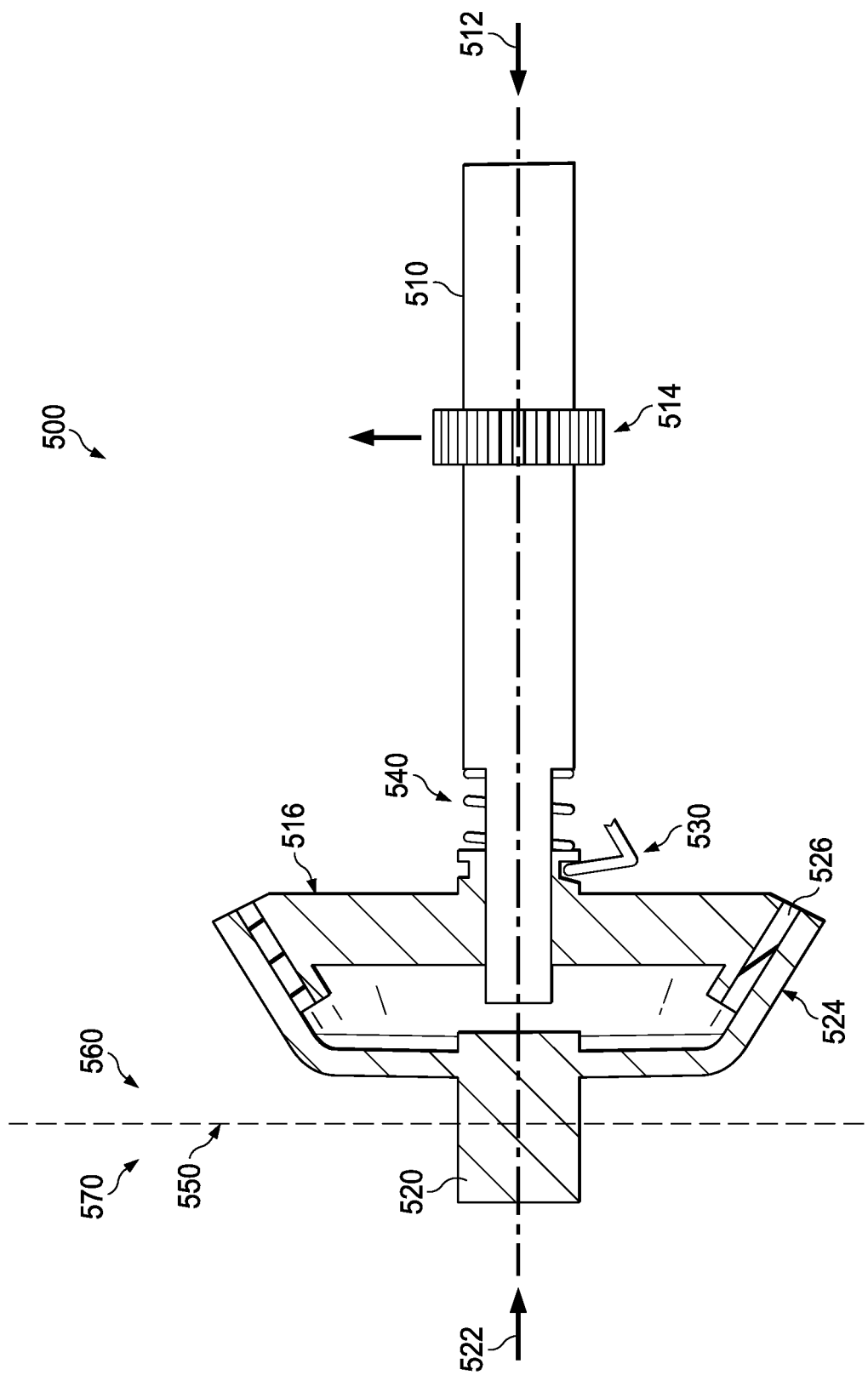
FIG. 5 illustrates an embodiment cone clutch type used in a door latch mechanism.

FIG. 5 illustrates an embodiment door latch 500 that uses a cone clutch mechanism to unlatch (i.e., engage/disengage) the driven shaft 510 from the driving shaft 520. As shown, a dashed line 550 is shown to separate components accessible on an exterior 570 of the vehicle from components accessible on an interior 560 of the vehicle.

The cone clutch is a type of friction (i.e., operates under the principle of friction) cone clutch that may be used to engage and disengage one shaft (e.g., driven shaft 510) to and from another shaft (e.g., driving shaft 520). It is noted that embodiment methods and structures in the present disclosure may similarly be implemented in any general clutch system/mechanism and more generally to any system/mechanism that when actuated, permits an energy source, from an exterior of the door, to be transferred to a keyless latch system to unlatch the door or to cause a stored energy in the keyless door latch system to unlatch the door.

As shown, the driven shaft 510 is part of the unlatching mechanism attached to the interior door handle 512. A force from the interior door handle 512 is transferred to a force at the unlocking component 114 and/or the door striker 112 through the gear 514. The transferred force at the door striker 112 causes the door striker 112 to unlatch from the door striker plate 122.

The force at the interior door handle 512 may unlatch the door striker 112 regardless of the locking component 114 being in a locked or an unlocked position. However, in some embodiments, a first force from the interior door handle may first cause the locking component 114 to move from the locked position to the unlocked position. A second force from the interior door handle may then be transferred to the door striker 112 to unlatch the door striker 112 from the door striker plate 122 as described above, with respect to FIGS. 4A-B.

The driving shaft 520 is part of the unlatching mechanism attached to the exterior door handle 522. The driving shaft 520 is connected to an outer (i.e., female) cone 524 and the driven shaft 510 is connected to an inner (i.e., male) cone 515.

In the engaged configuration, a friction lining 526 provides frictional contact between the inner section of the outer cone 524 and an outer section of the inner cone 515. In some embodiments, the friction lining may be on the inner cone 515. In other embodiments, the friction lining 526 may be on the outer cone 524. In yet other embodiments, both inner cone 515 and outer cone 524 may each have a friction lining 526.

When uncompressed, the engagement spring 540 drives the driven shaft 510 towards the driving shaft 520. The friction lining 526, generates a frictional contact between the inner cone 515 and the outer cone 524. The friction lining 526 mechanically connects the inner cone 515 to the outer cone 524, and as a result, connects the driving shaft 520 to the driven shaft 512. The clutch actuator 530 may be used to decompress or compress the engagement spring 540 and to engage or disengage the inner cone 515 from the outer cone 526.

As the driving shaft 520 is now connected to the driven shaft 512, a force at the exterior door handle 522 provides the same torque needed to unlatch the door striker 112 from the door striker plate 122 as if the force originated from the interior door handle 512.

In the disengaged configuration (i.e., engagement spring 540 is compressed), the inner cone 515 and the outer cone 524 are disconnected, and as a result, the driving shaft 520 is disconnected from the driven shaft 512. As noted, an actuation (e.g., pressing) of the clutch actuator 530 may be used to separate the inner cone 515 from the outer cone 524. The engagement spring 540 is in the compressed position and does not provide a force to maintain a frictional contact, at the friction lining 526, between the inner cone 515 and the outer cone 524. As the driving shaft 520 is disconnected to the driven shaft 512, a force at the exterior door handle 522 does not unlatch the door striker 112 from the door striker plate 122.

Figure 6A:
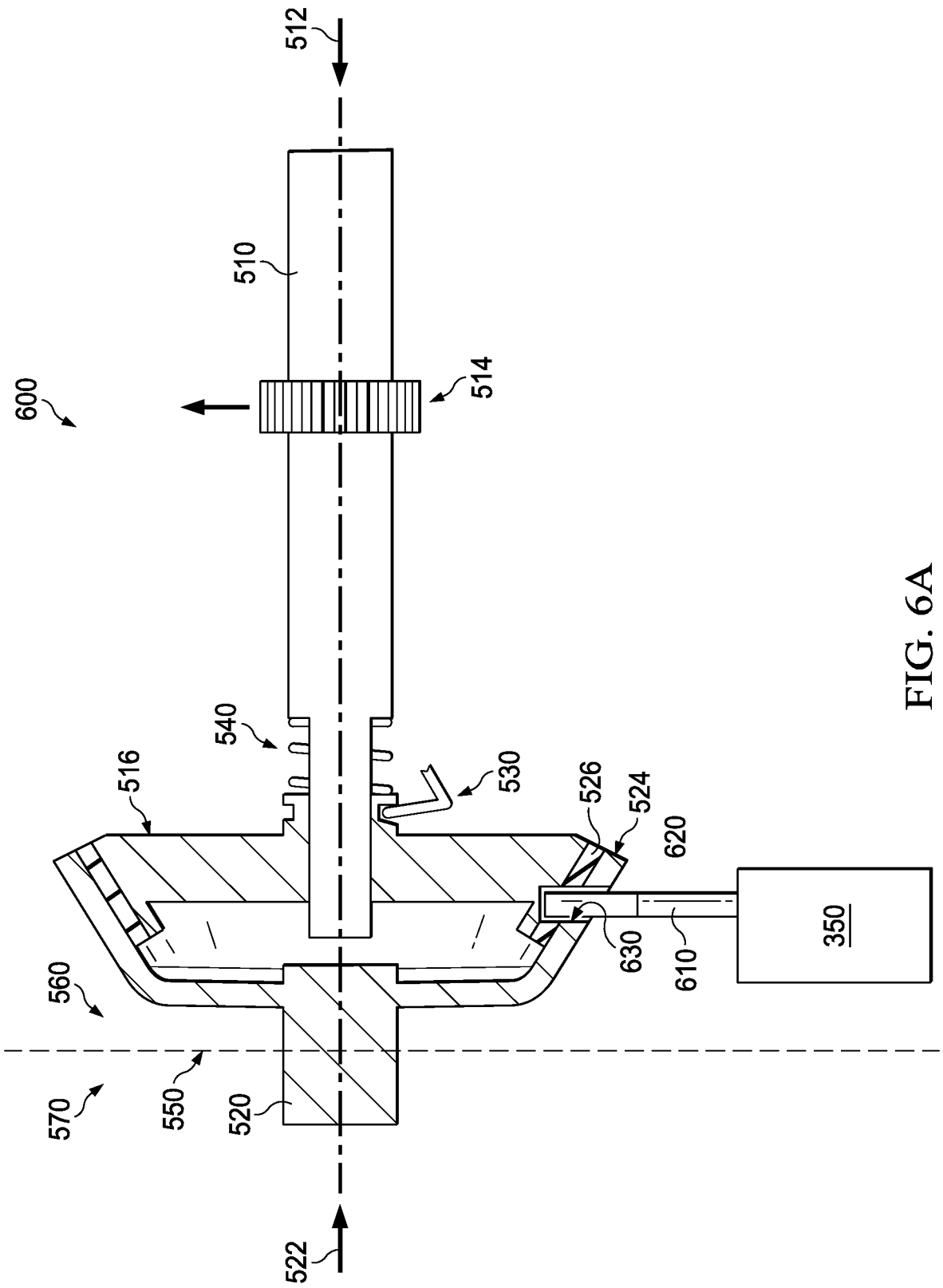
FIG. 6A illustrates an embodiment cone clutch having a clutch bypass mechanism.
Figure 6B:
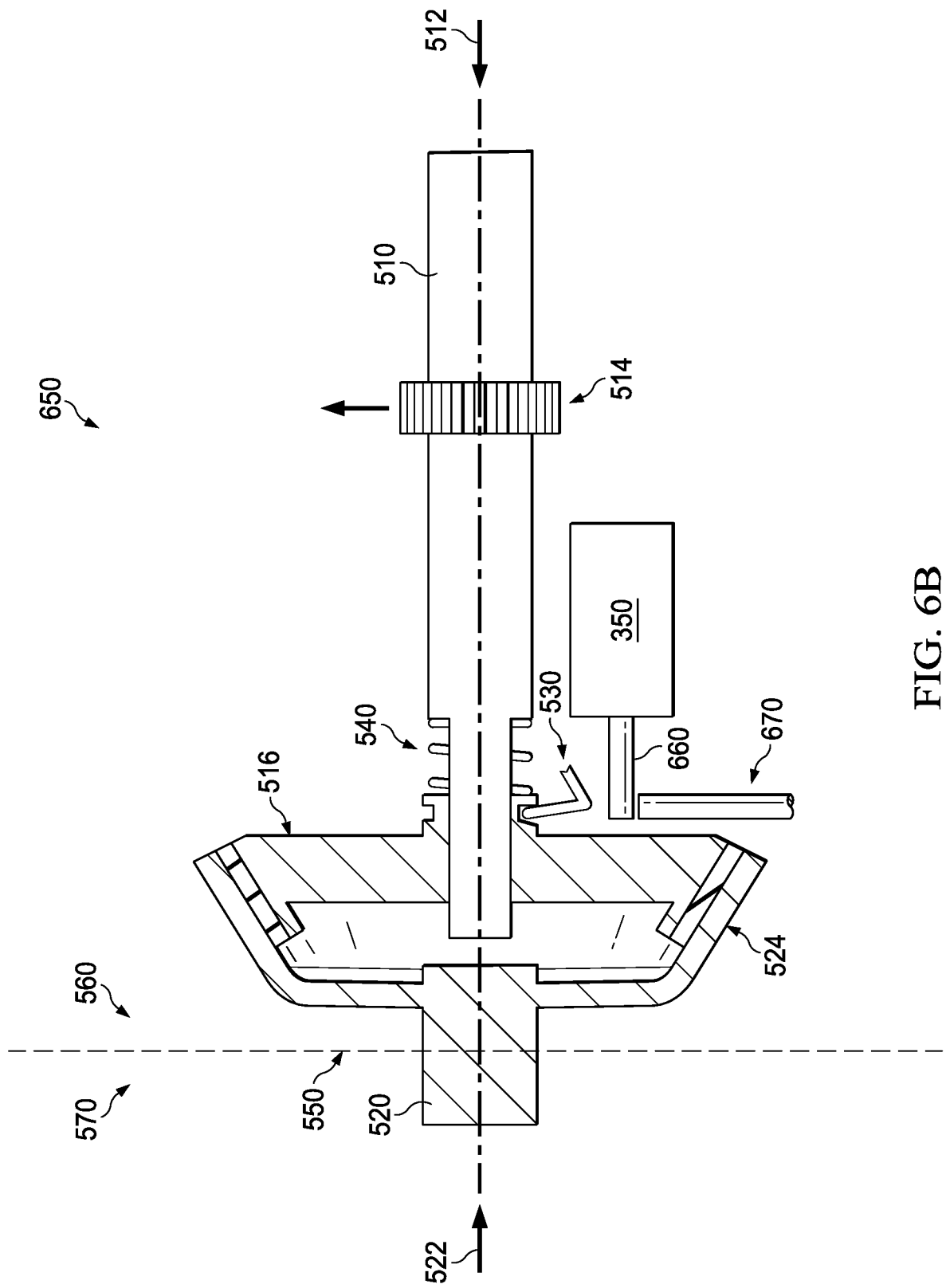
FIG. 6B illustrates an embodiment cone clutch having a spring loaded actuation shaft.
Figure 6C:
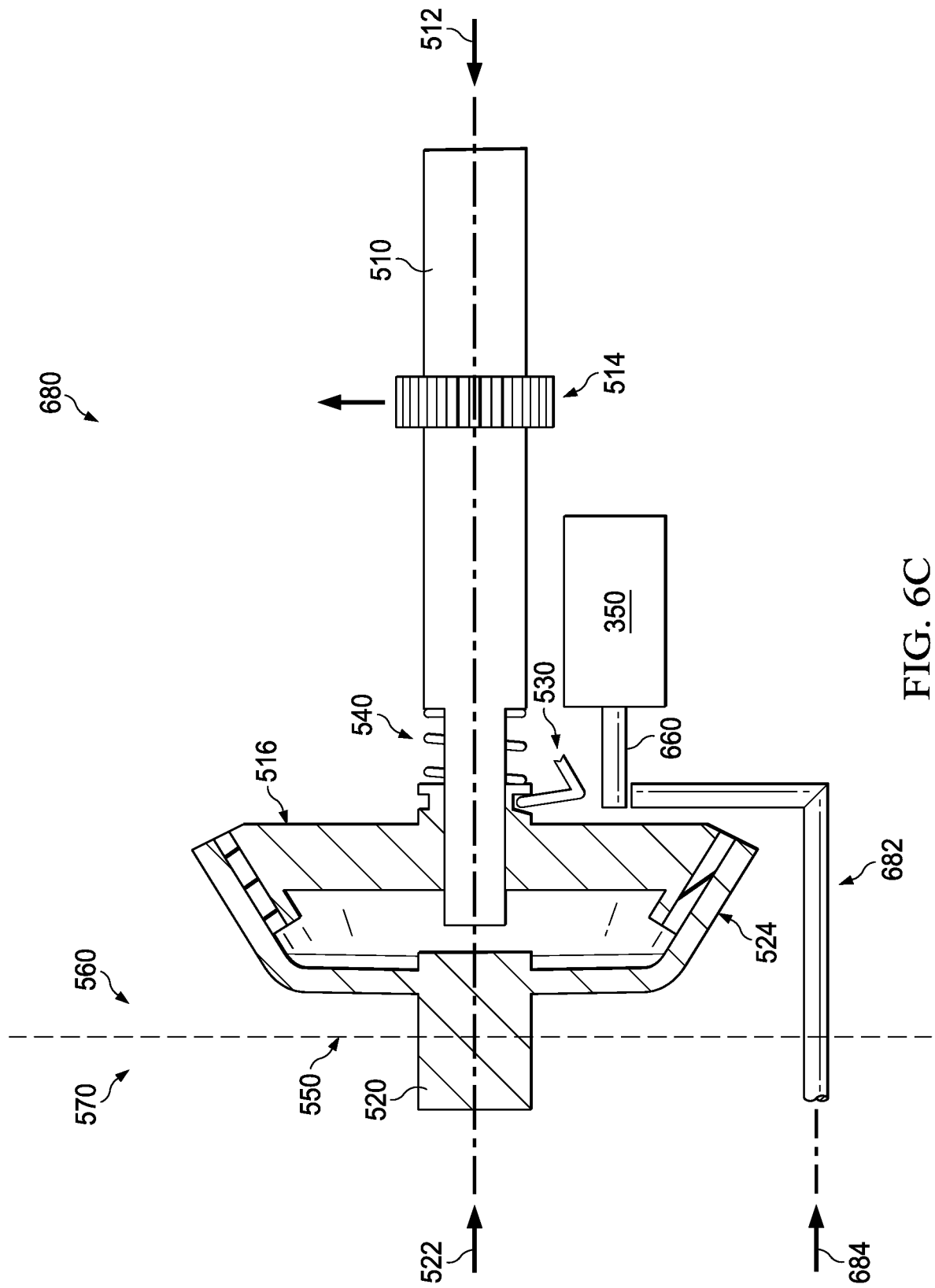
FIG. 6C illustrates an embodiment cone clutch having an externally accessible actuation shaft.

FIGS. 6A-C illustrate embodiment cone clutch type door latches that engage the driven shaft 510 to the driving shaft 520 using the actuator 350 in the secondary unlocking component 118. The actuator 350 actuates a pin or lever to directly or indirectly engage the two shafts. As a result, a motion or force (shown as element numbers 522 and 684) provided at the exterior 570 of the vehicle results in the same effect as if the motion or force (shown as element number 512) was attempted from the interior 560 of the vehicle. Therefore, by providing a minimal amount of energy (i.e., less than 10 millijoules) to the actuator 350, the vehicle door can be unlocked and/or unlatched. The mechanical force 522 exerted on the exterior handle door 132, similar to the force exerted to unlock a vehicle door from the interior of the vehicle, provides the auxiliary or backup force in the secondary operational mode.

FIG. 6A illustrates an embodiment cone clutch type door latch 600 that uses a clutch bypass mechanism to engage the inner cone 515 to the outer cone 524, in the secondary operational mode. In general, the cone clutch of FIG. 6A is similar in operation to the cone clutch of FIG. 5. However, a pin 610, a spike 620, and a guidance slot 630 in the cone clutch of FIG. 6A may be used as a bypass to the clutch actuator 530 to engage the inner cone 515 to the outer cone 524.

In the secondary operational mode, the actuator 350 can actuate the pin 610 and drive the spike 620, in the guidance slot 630, to move the inner cone 515 towards the outer cone 524. As the driving shaft 520 becomes mechanically connected to the driven shaft 512 by the insertion of the spike 620 in the guidance slot 630, a force at the exterior door handle 522 can provide the torque needed to unlatch the door striker 112 from the door striker plate 122. In an embodiment, when the outer cone 524 and the inner cone 515 return to their original position, the spike 620 falls back to its original position. Additional details, with respect to the movement of the spike 620 in the guidance slot 630, are provided in FIG. 7.

In some embodiments, the guidance slot 630 in the inner cone 515 may have a slot geometry that allows normal movement of the inner cone 515 even if the spike 620 is inserted in the guidance slot 630 during normal operation. This slot geometry advantageously prevents damage of the door latch mechanism in case the lock is actuated while the spike 620 is inserted in the guidance slot 630.

FIG. 6B illustrates an embodiment cone clutch type door latch 650 that uses an actuation shaft 670 to move the inner cone 515 towards the outer cone 524, in the secondary operational mode. In general, the cone clutch of FIG. 6B is similar in operation to the cone clutch of FIG. 5. However, the actuation shaft 670, having a spring-loaded mechanism, may be used to move the inner cone 515 towards the outer cone 524.

In the secondary operational mode, the actuator 350 can actuate the pin 660 to release a compressed spring in the actuation shaft 670. The release of the compressed spring in the actuation shaft 670 drives the clutch actuator 530 and pushes the inner cone 515 towards the outer cone 524 to create a frictional contact at the frictional lining 526. As the driving shaft 520 is now connected to the driven shaft 512, a force at the exterior door handle 522 can provide the torque needed to unlatch the door striker 112 from the door striker plate 122. In an embodiment, the spring in the actuation shaft 670 spring can be compressed by a reverse movement of the pin 660 and to return to its original position.

FIG. 6C illustrates an embodiment cone clutch type door latch 680 that uses an actuation shaft 682 to move the inner cone 515 towards the outer cone 524, in the secondary operational mode. In general, the cone clutch of FIG. 6C is similar in operation to the cone clutch of FIG. 6B. However, the actuation shaft 682 in FIG. 6C is accessible from the exterior 570 of the vehicle and may not be spring-loaded.

In the secondary operational mode, the actuator 350 can actuate the pin 660 to unblock the movement of the actuation shaft 682. Unlike the actuation shaft 670, the actuation shaft 682 is not spring loaded. Therefore, the actuation of the pin 660 does not automatically move the actuation shaft 682. In the cone clutch type door latch 680, an exterior force 684 exerted on the actuation shaft 682, from the exterior 570 of the vehicle, drives the clutch actuator 530, pushing the inner cone 515 towards the outer cone 524, and creating the frictional contact at the frictional lining 526. As the driving shaft 520 is now connected to the driven shaft 512, a force at the exterior door handle 522 can provide the torque needed to unlatch the door striker 112 from the door striker plate 122.

Figure 7A:
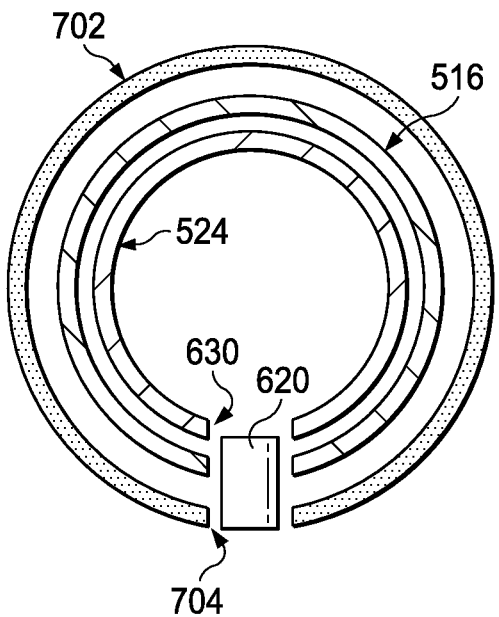
FIGS. 7A-D illustrate an embodiment clutch bypass operation in the clutch bypass mechanism.

FIGS. 7A-D illustrate an embodiment clutch bypass mechanism used to engage an inner cone 516 to an outer cone 6524 of a cone clutch. As shown in FIG. 7A, the pin 610 is not actuated and the spike 620 does not connect the outer cone 524 to the inner cone 516.

Figure 7B:
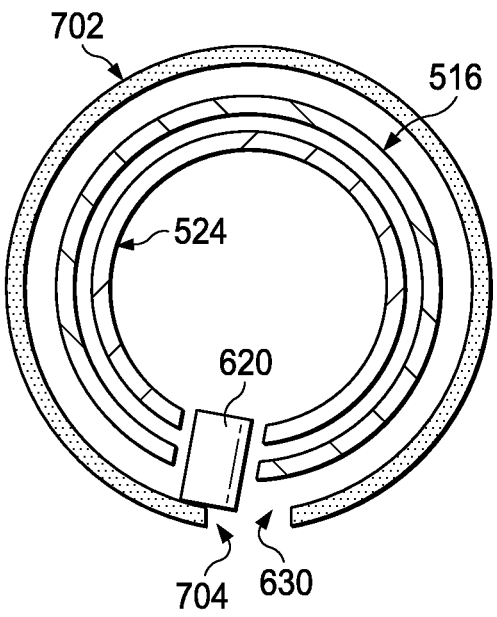

In FIG. 7B, the spike 620 is driven into the guidance slot 630 of the inner cone 516 by the cam lip 702. In this configuration, the inner cone 516 is moving towards the outer cone 524 to engage the driven shaft 510 to the driving shaft 520.

Figure 7C:
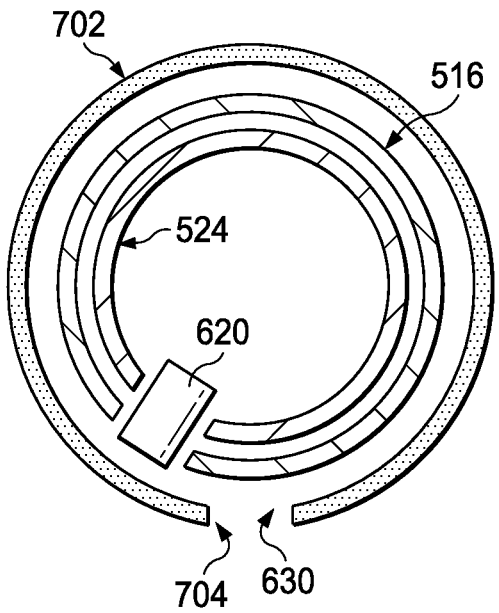

In FIG. 7C, as the cam lip 702 is cleared, the spike 620 fully engages the inner cone 516 and the outer cone 524. This results in the friction lining 526 to create a frictional contact between the inner cone 516 and the outer cone 524. The driven shaft 510 is engaged to the driving shaft 520 and a force exerted on the exterior door handle can cause the door striker 112 to unlatch from the door striker plate 122.

Figure 7D:
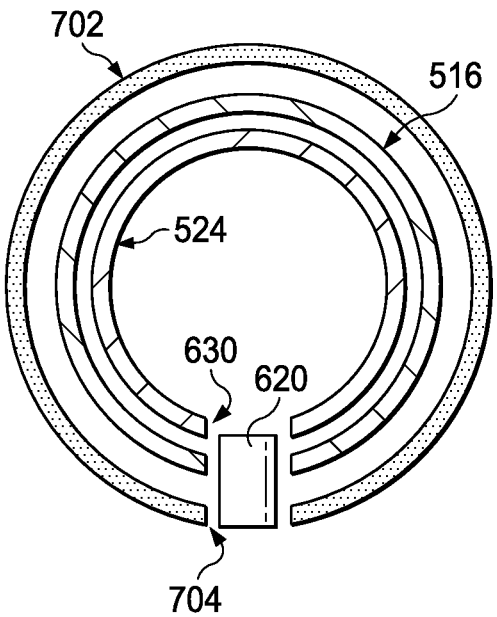

In FIG. 7D, as the inner cone 516 and the outer cone 524 return to their original position, the spike 620 also returns to its original position. In some embodiments, the pin 610 also returns to its original position.

Figure 8:
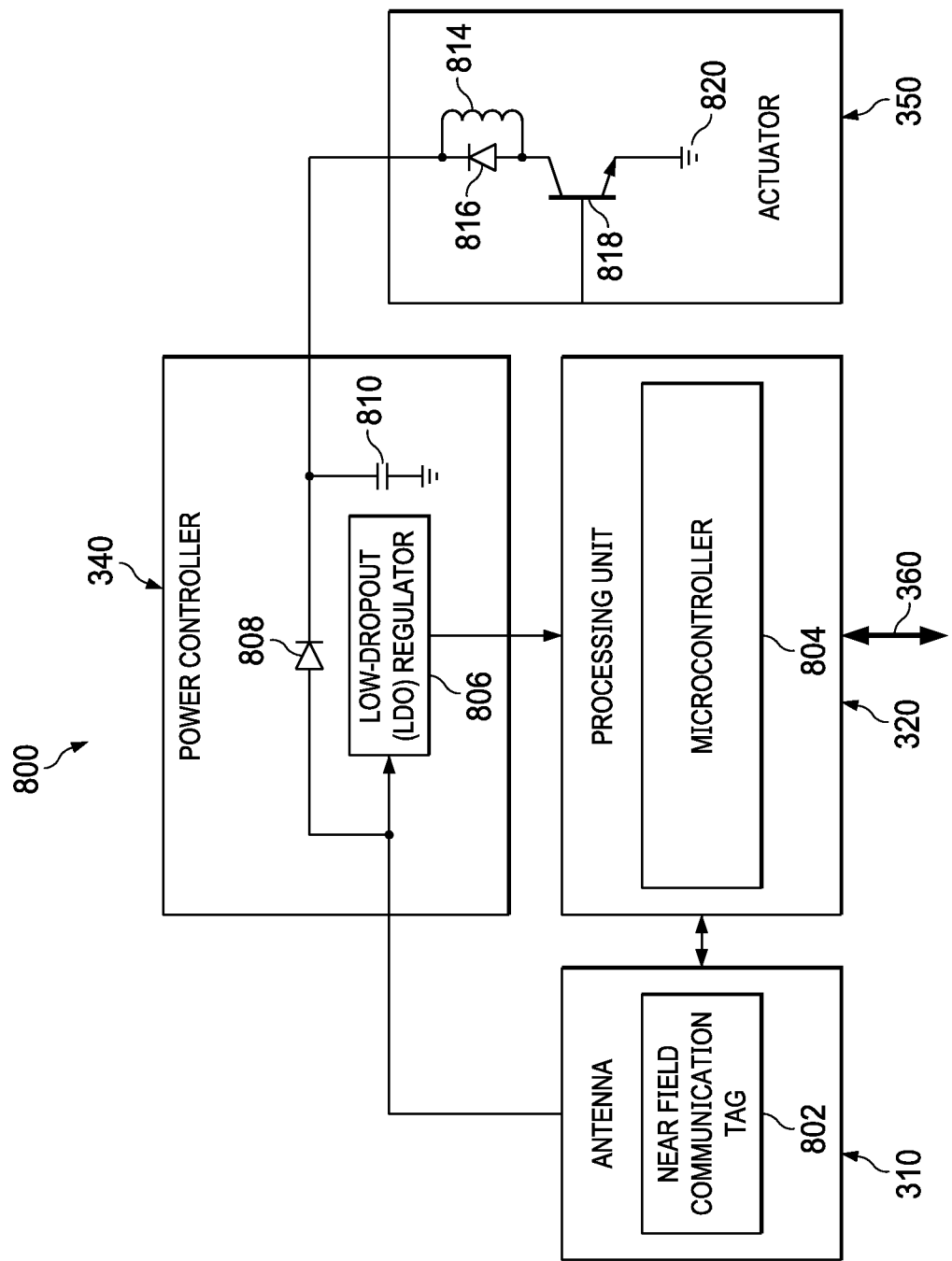
FIG. 8 illustrates a schematic of an embodiment secondary unlocking component.

FIG. 8 illustrates a schematic 800 of an embodiment secondary unlocking component. As shown, the antenna 310 includes an NFC tag antenna 802 capable of exchanging an I2C serial protocol format signal with the antenna 240 of the keyless remote 200. The I2C signal can carry the authorization and/or authentication signals used to determine whether the keyless remote 200 is authorized to unlock the vehicle. Additionally, the NFC tag antenna 802 can be used in the induced power transference, compliant with the NFC protocols, from the antenna 240.

The processing unit 320 includes a microcontroller 804 with an internal memory unit. The microcontroller 804 can receive the I2C signal from the NFC tag antenna 802 and transmit an I2C signal using the NFC tag antenna 802 to communicate with the keyless remote 200. The authorization signal can be verified by the microcontroller 804 using data stored in its internal memory. The microcontroller 804, after verifying that the keyless remote 200 is authorized to unlock the door, can determine whether the primary unlocking component 116 is disabled using the communication bus 360 and, based thereon, generate a control signal to the actuator 350.

The power controller 340 includes a low-dropout (LDO) regulator 806, a diode 808, and a shunt capacitor 810. The LDO regulator 806 is used to harvest the energy from the NFC tag antenna 802 and to regulate the power to the microcontroller 804. The shunt capacitor 810 can act as a storage unit to charge and provide the necessary power to the actuator 350. The diode 808 can be used to prevent current from traveling in the reverse direction, for example, during charging of the shunt capacitor 810.

The attenuator 350 includes a transistor 818, such as a field effect transistor (FET), having a gate node, a drain node, and a source node. The gate node of the transistor 818 receives the control signal from the microcontroller 804 in the secondary operational mode. The drain node of the transistor 818 is connected to a reference voltage. The source node is connected to the diode 816, which is arranged in parallel with the wounded coil (i.e., solenoid) 814. The wounded coil 814 can be a micro-solenoid capable of operating at low power to actuate a pin, valve, or lever. The diode 816 can be a flywheel diode used to protect the wounded coil 814.

Figure 9:
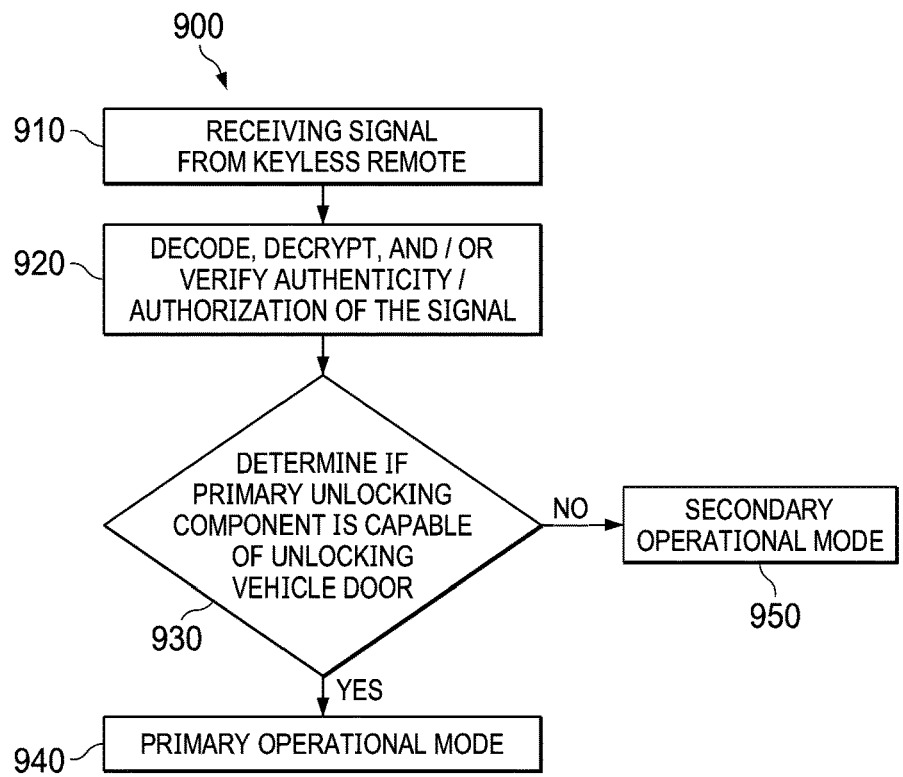
FIG. 9 is a flowchart of an embodiment method for unlocking a vehicle door equipped with a keyless entry system.

FIG. 9 is a flowchart of an embodiment method 900 for unlocking a vehicle door equipped with an electronic keyless door latch system 110, having a primary and a secondary operational mode, using a keyless remote 200. At step 910, the electronic keyless door latch system no receives a signal from the keyless remote 200. The signal may be received at the antenna 310. In some embodiments, the signal may be encoded and/or encrypted.

Optionally, at step 920, the processing unit 320 decodes and/or decrypts the wireless signal received at step 910 to verify the authenticity of the signal and the authorization to unlock the vehicle door.

At step 930, the processing unit 320, or a processor in the vehicle, determines if the primary unlocking component is capable of unlocking the door. In an embodiment, the processing unit 320 can determine whether the energy provided by the vehicle's primary power supply meets a minimum threshold requirement. In another embodiment, the processing unit 320 may detect a fault at the primary unlocking component as a result of a bad or dying car battery, a mechanical failure in the primary unlocking mechanism (e.g., fried primary solenoid), power line fault from the car battery to the primary unlocking component, signal fault at the vehicle computer or primary unlocking component, a failure to receive a confirmation signal regarding proper functioning of the vehicle computer or primary unlocking component, or other reasons to determine that the primary unlocking component is capable of unlocking the door.

In other embodiments, the processing unit 320 can determine whether or not the primary unlocking component is capable of unlocking the door by determining the occurrence or an indication of the occurrence of an event or a combination of events. For instance, the processing unit 320 can determine that a child is sitting on the backseat of the vehicle, that the keyless remote is in the vehicle, and that the vehicle doors are locked. The combination of these events may be selected, or programmed, to trigger a flag or to indicate that the primary unlocking component is not capable of unlocking the door.

In some embodiments, steps 920 and 930 are reversed. In some embodiments, steps 920 and 930 are performed at the same time. If the processing unit 320 determines that the primary unlocking component is capable of unlocking the door, that the signal received at step 910 is verified to be authentic, and/or the signal received at step 910 provides authorization to unlock the door, at step 940, the primary unlocking component 116 operating in the primary operational mode, unlocks the locking component 114 using the energy provided by the vehicle's primary power supply.

However, if the processing unit 320 determines that primary unlocking component is not capable of unlocking the door, but that the signal received at step 910 is verified to be authentic and/or the signal received at step 910 provides authorization to unlock the door, at step 950, the secondary unlocking component 118 operating in the secondary operational mode actuates the actuator 350 using the energy provided from the keyless remote 200.

Figure 10:
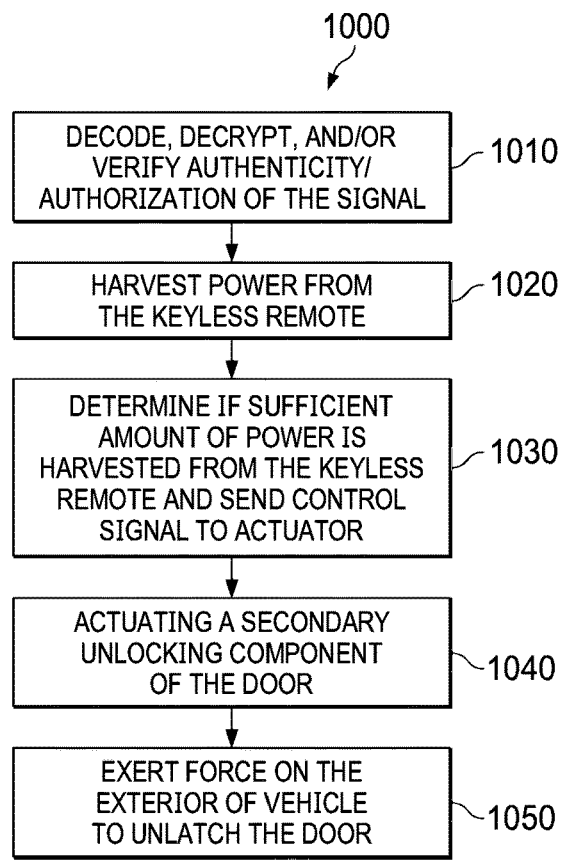
FIG. 10 is a flowchart of an embodiment method for unlocking a vehicle door in a secondary operational mode of a keyless entry system.

FIG. 10 is a flowchart of an embodiment method 1000 for unlocking a vehicle door in the secondary operational mode. As described above, with respect to FIG. 9, the electronic keyless door latch system no is operating in the secondary operational mode in response to the processing unit 320 determining that the vehicle's primary power supply is unable to provide a minimum energy to the primary unlocking component 116.

Optionally, at step 1010, the processing unit 320 verifies the authenticity of the signal and the authorization to unlock the door from the signal received at step 910. In this embodiment, step 1010 may be a duplicate to step 920 of FIG. 9, or replace step 920 above. If the signal received at step 910 is determined to not be an authentic signal and/or that the signal does not provide authorization to unlock the vehicle door, the door remains locked.

However, at step 1020, if the processing unit 320 determines that the minimum power threshold of the vehicle's primary power supply is not met, but that the signal received at step 910 is verified to be authentic and/or the signal received at step 910 provides authorization to unlock the door, the power controller 340 begins to harvest power from the keyless remote 200 for the operation of the secondary unlocking component 118.

At step 1030, the processing unit 320 determines that the power controller 340 is capable of providing sufficient energy to the actuator 350 and transmits a control signal to the actuator 350. In response, at step 1040, the actuator 350 may actuate a secondary unlocking component of the door. In one embodiment, the actuating of the secondary unlocking component permits an energy source, from an exterior of the door, to be transferred to the keyless door latch system to unlatch the door. In another embodiment, the actuating of the secondary unlocking component causes a stored energy in the keyless door latch system to unlatch the door.

Optionally, at step 1050, a user's motion on a knob, lever, or similar structure at the exterior of the vehicle, generates the force that is transferred to unlatch the door from the vehicle frame and/or to unlock the vehicle door.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method of operating a keyless door latch system of a door of a vehicle, the method comprising:
   detecting a failure of a primary unlocking component of the keyless door latch system or detecting an occurrence of an event associated with the vehicle; and
   in response to detecting the failure of the primary unlocking component or the occurrence of the event, unlocking the door using a secondary unlocking component of the keyless door latch system, where the step of unlocking the door using the secondary unlocking component comprising:
   receiving a radio frequency (RF) signal;
   harvesting energy from the RF signal using a power controller of the keyless door latch system;
   generating, by a microcontroller of the keyless door latch system, a control signal based on the received RF signal; and
   in response to the control signal, actuating, by an actuator of the keyless door latch system coupled to the microcontroller, a mechanical coupling mechanism such that an external force, exerted from an exterior of the door, is transferred to the keyless door latch system to unlock the door, wherein the actuator is powered by the harvested energy, wherein the secondary unlocking component is a backup for the primary unlocking component of the keyless door latch system.

2. The method of claim 1, further comprising powering the microcontroller using the harvested energy.

3. The method of claim 1, wherein the RF signal is a near-field RF signal.

4. The method of claim 1, wherein receiving the RF signal comprises receiving the RF signal transmitted by a keyless remote in a vicinity of the keyless door latch system.

5. The method of claim 1, wherein the RF signal comprises an authorization signal, wherein generating the control signal comprises:
   verifying, using the microcontroller, authenticity of the RF signal based on an authorization verification key stored in a memory module of the keyless door latch system and the authorization signal; and
   generating the control signal in response to determining that the RF signal is authentic.

6. The method of claim 1, wherein the mechanical coupling mechanism comprises:
   an inner cone connected to a shaft connected to an interior door handle, the inner cone having a first guidance slot;
   an outer cone connected to a shaft connected to an exterior door handle, the outer cone having a second guidance slot, the first guidance slot and the second guidance slot aligned with each other; and
   a spike located within the first guidance slot and the second guidance slot, wherein the actuator is configured to actuate a pin in the secondary unlocking component, wherein the spike is configured to move the inner cone towards the outer cone based on the actuation of the pin and to mechanically connect the inner cone and the outer cone.

7. The method of claim 1, wherein the actuator is a solenoid, a micro-solenoid, an electrical motor, or a stepper motor.

8. The method of claim 1, wherein the event is an accident involving the vehicle, a failure of the vehicle engine, a fire near or within the vehicle, or disablement of a driver or a passenger of the vehicle.

9. A method of operating a keyless door latch system of a door of a vehicle, the method comprising:
   receiving, using an antenna of the keyless door latch system, a radio frequency (RF) signal;
   harvesting energy from the RF signal using a power controller of the keyless door latch system;
   providing a power source for the keyless door latch system using the harvested energy;
   generating, by a microcontroller of the keyless door latch system, a control signal for unlocking the door based on the received RF signal; and
   actuating, by an actuator of the keyless door latch system, a secondary unlocking component of the door in accordance with the control signal, wherein the actuating of the secondary unlocking component causes the door to be unlatched, wherein the secondary unlocking component is a backup for a primary unlocking component of the door.

10. The method of claim 9, wherein the antenna is a near-field communication (NFC) antenna configured to operate in accordance with NFC communication protocols.

11. The method of claim 9, wherein the RF signal is received from a keyless remote in a vicinity of the keyless door latch system.

12. The method of claim 9, wherein providing the power source comprises providing a first power source for the microcontroller and providing a second power source for the actuator.

13. The method of claim 9, wherein the secondary unlocking component comprises a clutch component configured to receive the harvested energy to unlatch the door, wherein the clutch component comprises:
   an inner cone connected to a shaft connected to an interior door handle;
   a clutch actuator connected to the inner cone;
   an outer cone connected to a shaft connected to an exterior door handle; and
   an actuation shaft configured to engage the clutch actuator causing the inner cone to move towards the outer cone and mechanically connect the inner cone to the outer cone.

14. The method of claim 9, wherein the RF signal comprises an authorization signal, wherein generating the control signal comprises:
   verifying authenticity of the authorization signal using an authorization verification key stored in a memory module of the keyless door latch system; and
   generating the control signal after verifying that the authorization signal is authentic.

15. The method of claim 9, wherein the actuator is a solenoid, a micro-solenoid, an electrical motor, or a stepper motor.

16. A method of operating a keyless door latch system for a door of a vehicle, the method comprising:

harvesting, by an energy harvesting circuit of the keyless door latch system, energy from a radio frequency (RF) signal transmitted by a keyless remote of the keyless door latch system, wherein the RF signal comprises an authentication signal;

generating, by a microcontroller of the keyless door latch system, a control signal based on the authentication signal, wherein the control signal controls unlocking of the door; and in response to the control signal, actuating, by an actuator of the keyless door latch system, a secondary unlocking component of the door using the harvested energy, wherein the actuating of the secondary unlocking component causes the door to be unlatched, wherein the secondary unlocking component is a backup of a primary unlocking component of the keyless door latch system.

17. The method of claim 16, wherein the actuating of the secondary unlocking component allows an external force, exerted from an exterior of the door, to be transferred to the keyless door latch system to unlock the door.

18. The method of claim 16, wherein the microcontroller is powered by the harvested energy.

19. The method of claim 16, further comprising receiving, by an antenna of the keyless door latch system, the RF signal, wherein the antenna is a near-field communication (NFC) antenna capable of operating in accordance with NFC communication protocols.

20. The method of claim 16, wherein generating the control signal comprises:

retrieving, by the microcontroller, an authorization verification key from a memory region of the keyless door latch system; and verifying, by the microcontroller, authenticity of the RF signal using the authorization verification key and the authentication signal.

* * * * *

UNITED STATES PATENT AND TRADEMARK OFFICE
CERTIFICATE OF CORRECTION

| | | |
|---|---|---|
| PATENT NO. | : 11,808,063 B2 | Page 1 of 1 |
| APPLICATION NO. | : 18/178201 | |
| DATED | : November 7, 2023 | |
| INVENTOR(S) | : Sy et al. | |

It is certified that error appears in the above-identified patent and that said Letters Patent is hereby corrected as shown below:

On the Title Page

Item (71), in Column 1, in "Applicants", Line 1, after "Agrate" insert -- Brianza --.

Item (72), in Column 1, in "Inventors", Line 2, after "Cavenago" insert -- Brianza --.

Signed and Sealed this
Thirtieth Day of January, 2024

*Katherine Kelly Vidal*

Katherine Kelly Vidal
*Director of the United States Patent and Trademark Office*